July 14, 1959  J. R. YOUNG  2,894,616
AUTOMATIC MATERIAL HANDLING MECHANISM
Filed July 6, 1955  2 Sheets-Sheet 1
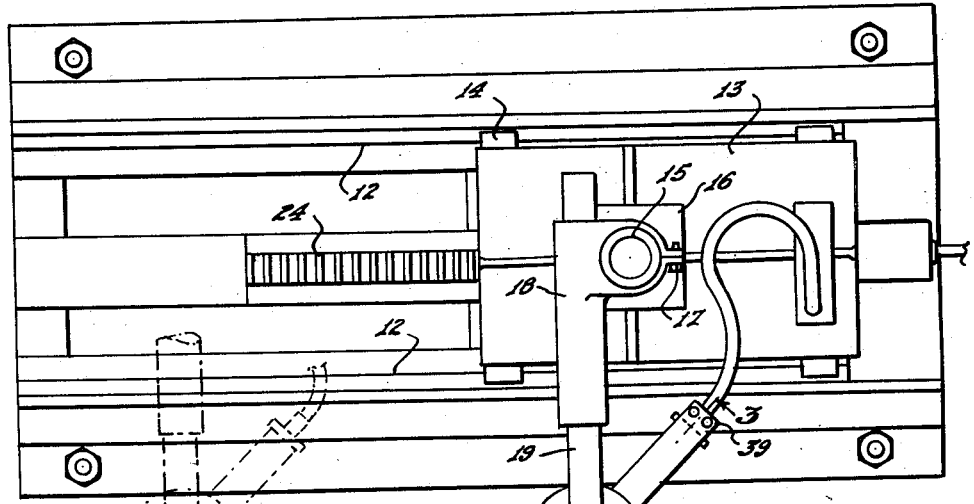
Fig.1.
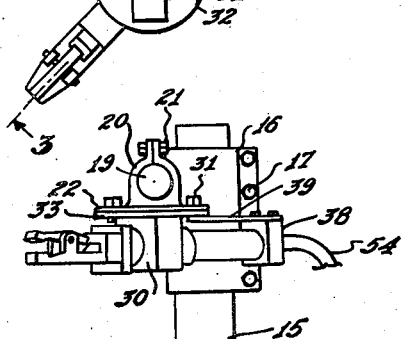
Fig.2.
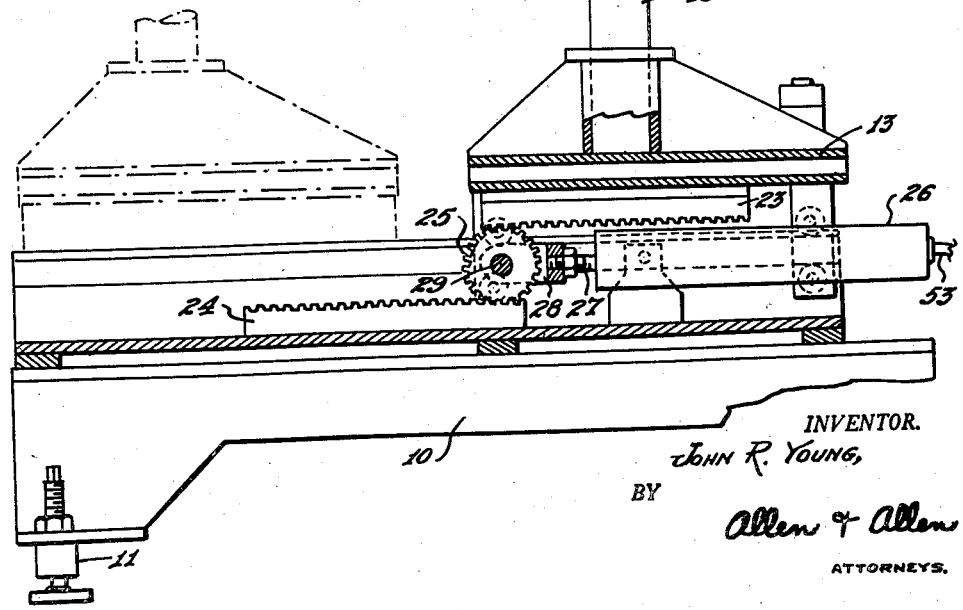
INVENTOR.
John R. Young,
BY
Allen & Allen
ATTORNEYS.

July 14, 1959   J. R. YOUNG   2,894,616
AUTOMATIC MATERIAL HANDLING MECHANISM
Filed July 6, 1955   2 Sheets-Sheet 2

INVENTOR.
JOHN R. YOUNG,
BY Allen + Allen
ATTORNEYS.

:::

United States Patent Office 2,894,616
Patented July 14, 1959

2,894,616

AUTOMATIC MATERIAL HANDLING MECHANISM

John R. Young, Hamilton, Ohio

Application July 6, 1955, Serial No. 520,206

3 Claims. (Cl. 198—218)

My invention resides in the provision of a novel automatic material handling mechanism by means of which articles may be taken from one position and transferred to another, the mechanism of the instant invention being generally of the type shown, described and claimed in my co-pending application Serial No. 492,972 filed March 8, 1955, and entitled, Improvements in Automatic Material Handling Devices.

Specifically it is an object of my invention to provide a mechanism which, in response to another mechanism, will advance to such other mechanism, take an article from this other mechanism, remove the article to a desired position and then release same.

It is an important object of my invention to provide a mechanism of the slave class which may be used with various other machines about a plant as needed.

It is also an object of my invention to provide a mechanism of the type described in which during operation the various paths of travel lie in the same horizontal plane.

It is also an object of this invention to provide an article handling mechanism which is relatively simple to manufacture, both simple and economical to use and of rugged construction.

These and other objects and advantages of my invention will become apparent to those skilled in the art during the course of the following description and with reference to the accompanying drawings, in which drawings like numerals are employed to designate like parts throughout and in which:

Figure 1 is a fragmentary plan view of the mechanism of this invention,

Figure 2 is a side elevation, partly in section, of the mechanism of Figure 1,

Figure 3:
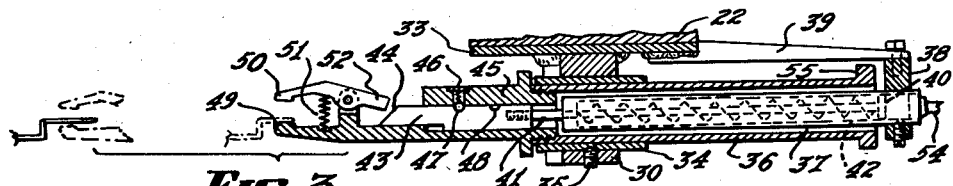
Figure 3 is an enlarged section taken on the line 3—3 of Figure 1.
Figure 4:
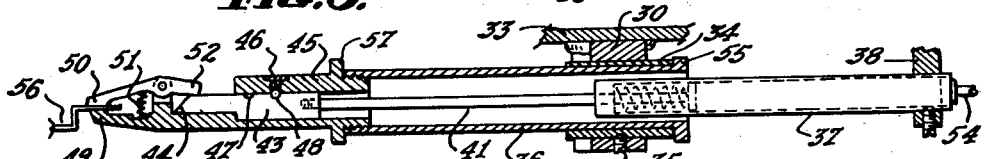
Figure 5:
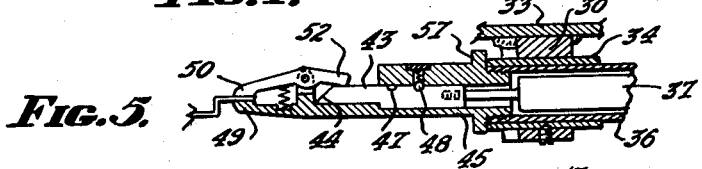
Figure 6:
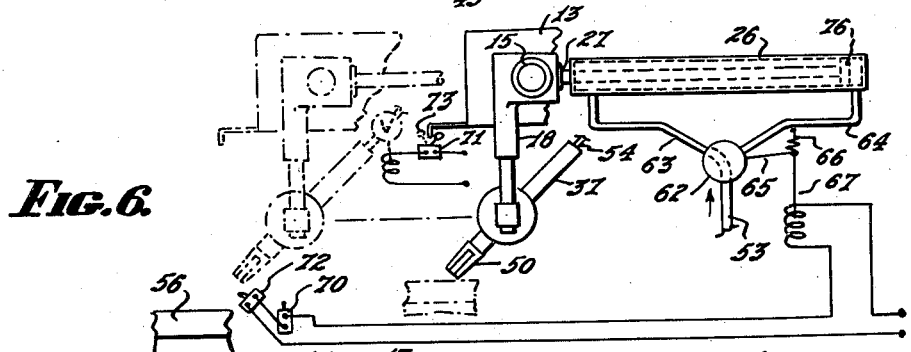
Figure 7:
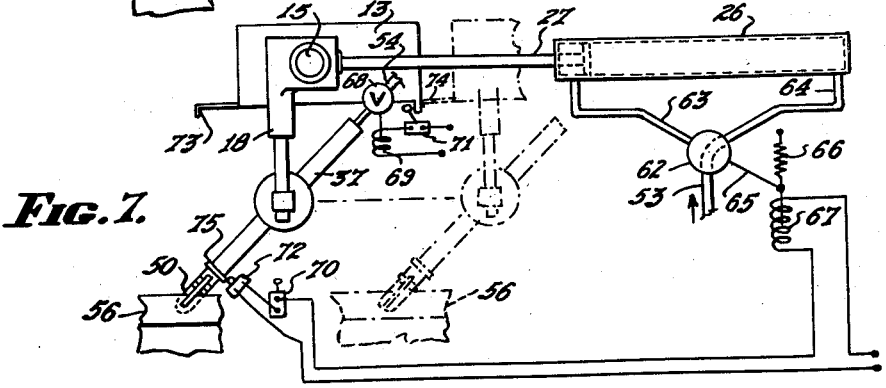

Figure 4 is a view generally similar to that of Figure 3 but showing a different position of the parts, Figure 5 shows a still further position of the parts as will occur during operation of the mechanism, Figure 6 is a more or less schematic diagram illustrating certain sequence of operations, and Figure 7 is another schematic diagram illustrating further operations of the mechanism of this invention.

Referring now particularly to Figures 1 and 2 it will be seen that the mechanism of this invention comprises a main frame or bed 10 which may be adjustably located on feet 11. A pair of tracks 12 are mounted on the bed of the machine. A carriage 13 has wheels 14 which engage the tracks 12.

Fixed in the carriage 13 is a vertical post 15. A split bracket 16 engages the post 15 and may be clamped at any desired vertical position by the ordinary nut and bolt arrangement indicated at 17. The clamp means 16 has fixed thereto or formed integral therewith a horizontal tube or sleeve 18 in which there is positioned a horizontal post 19.

Additional clamp means 20 are mounted on the post 19 and may be maintained at selected positions by tightening the ordinary nut-and-bolt arrangement 21. Fixed to or formed integral with the clamp mechaism 20 is a base plate 22. The jaw mechanism, to be described in more detail shortly, is fastened to this plate 22.

Fixed in the carriage 13 is a rack 23. A similar rack 24 is fixed on the frame bed 10. A rack wheel 25 engages these two racks 23 and 24. A cylinder 26 having a piston and piston rod 27 is mounted on the frame 10. To the end of the piston rod 27 is fixed a fork member 28 which has a pin 29 on which the rack wheel 25 is mounted. Reciprocation of the piston rod 27 by actuation of the piston within the cylinder 26 will result in reciprocation of the carriage 13. The rack mechanism just described makes possible a greater movement of the carriage 13 with a shorter travel of the piston rod 27. If desired, however, the rack mechanism could be eliminated and the carriage simply made to move with the piston rod directly.

As shown in Figure 2 the jaw mechanism includes a block 30 which may be bolted to the plate 22 as indicated at 31. The plate 22 is provided with arcuate slots 32 so that the angular position of the block 30 may be varied as desired. To this end it will be noted that the bolts 31 engage a plate 33 which may be welded to or formed integral with the block 30.

Referring now to Figures 2, 3, 4 and 5 I shall describe the jaw mechanism in greater detail. Within the block 30, which is fixed to the plate 33, there is mounted a first sleeve 34 which may be maintained in fixed position by means of the set screw 35. Slidably located within this first sleeve is a second sleeve 36. A cylinder 37 is positioned within the second sleeve 36. This cylinder has a bearing 38 supported from a brace member 39 which is fixed to the lower plate 33.

Within the cylinder 37 there is slidably positioned a piston head 40 to which there is fixed the piston rod 41. A spring 42 normally urges the piston head 40 to the position illustrated in Figure 3.

An elongated jaw actuating member 43 having a cam surface 44 is fixed to one end of the piston rod 41. This jaw actuating member 43 is located within a jaw housing 45 and it is maintained in one of two positions therein by means of spring-biased detent means 46 which urges a ball into one of the notches 47 or 48. The jaw housing 45 may be threaded or otherwise secured to the second sleeve 36.

The lower portion of the jaw housing 45 is extended to provide the lower jaw member 49. The upper jaw member 50 is pivotally mounted on a lug extending from the lower part of the jaw housing 45. A spring 51 normally maintains the jaw members 49 and 50 apart as indicated in Figure 3. The jaw member 50 has a rearward extension 52 adapted to be engaged by the cam surface 44, as will be described, so as to pivot the member 50 against action of the spring 51 into clamping engagement with the lower jaw member 49.

In describing the operation of this mechanism it will be understood that the cylinders 26 and 37 are provided with lines 53 and 54 respectively which are connected to a suitable source of pneumatic or other ffuid supply.

Operation of the jaw mechanisms

Referring now to Figures 3, 4 and 5 I shall describe the movements of the various jaw members as will occur during operation of the mechanism of this invention. Figure 3 illustrates the normal position of the various parts just prior to the start of the operating cycle. In this position the spring-biased detent means 46 will engage a ball within the notch 47. Upon actuation of the piston 40 within the cylinder 37 the piston rod 41 will be moved to the left as viewed in Figure 3. Such movement will also result in similar movement of the jaw housing 45, the structure carried by this housing and the slidable sleeve 36.

As the piston 40 nears the end of its travel the lug 55 on the sleeve 36 will abut the fixed sleeve 34. This is shown in Figure 4. The piston rod 41, however, will continue to move a short distance. This results in the jaw acuating member 43 sliding with respect to the jaw housing 45, the spring-biased detent means releasing to permit the detent ball to shift from the notch 47 to the notch 48. During this time the cam surface 44 will engage the rear extension 52 of the jaw member 50 and thereby rock it about its pivot point into clamping contact with the lower jaw member 49.

When the fluid supply introduced at 54 within the cylinder 37 is cut off the spring 42 acting against the piston 40 will urge the piston rod 41 to the right as viewed in Figures 4 and 5. During initial movement of this piston rod 41 to the right the spring-biased detent means will maintain the ball within notch 48. Thus the workpiece 56 clamped between the jaw members 49 and 50 will be maintained in such clamped position. Just prior to full return of the piston rod 41, however, the lug 57 on the jaw housing 45 will abut the fixed sleeve 34. Although this will arrest further movement of the jaw housing 45 the spring 42 is sufficiently strong to move the piston 40 to its full extent within the cylinder 37. This will result in the detent means 46 permitting the ball to shift from notch 48 to notch 47, the jaw-actuating member 43 thus moving a short distance after the jaw housing 45 has stopped. This movement of the jaw-actuating member 43 results in withdrawal of the cam surface 44 from contact with the rear extension 52 of the jaw member 50 whereupon the spring 51 will again urge the jaw member 50 to its open position thus releasing the article 56. Figure 5 shows the position of parts just after the lug 57 has contacted the sleeve 34 and just prior to final movement of the jaw-actuating member 43 just described. Such final movement will bring the jaw 50 to the dotted line position shown in Figure 5.

*General operation of the complete mechanism*

Referring now to Figures 6 and 7 I shall described the manner in which the mechanism comprising the instant invention operates. It will be understood that the conduits 53 and 54 are connected with a suitable source of fluid power which for the sake of convenience I shall describe as being pneumatic. Obviously hydraulic power could be used if desired and available.

A valve 62 controls admission of air to either end of the cylinder 26 through the lines 63 and 64. This valve has an operating member 65 which is fastened to a spring 66 and to a solenoid 67.

A valve 68 controls admission of air to the cylinder 37. This valve is actuated by a solenoid 69.

There is a first limit switch 70 located in an electric circuit which includes the solenoid 67. There is a second limit switch 71 located in an electric circuit which includes the solenoid 69. Also, there is a third limit switch 72 which is located in the same circuit as the first limit switch 70. The carriage 13 has mounted thereon members 73 and 74 which will actuate the limit switch 71 at certain times during operation of the mechanism as will be described. The jaw arrangement has a member 75 which will actuate the limit switch 72 at the proper time.

At the start of an operating cycle the various mechanisms will be in the position shown in full lines in Figure 6. This will be the position the parts will assume upon completion of a previous cycle. It will be understood that the limit switch 70 is so located as to be actuated by the master machine which the mechanism of this invention is serving. When the master machine has completed whatever type of operation it is doing and has brought a workpiece into position for removal by the slave machine of this invention, the limit switch 70 will be automatically actuated.

Actuation of the limit switch 70 in response to the master mahcine will close a circuit which includes the solenoid 67. When the solenoid 67 is thus energized the member 65 will be moved in opposition to the spring 66 so as to direct air from the conduit 53 into the conduit 64. This will introduce air within the cylinder 26 in back of the piston 76 and thus urge this piston to the left as viewed in Figure 6. Such movement of the piston 76 and its rod 27 will move the carriage 13 to the dotted line position of Figure 6 or full-line position of Figure 7.

When the carriage 13 has been moved to the full-line position of Figure 7 the member 74 will engage the switch 71 thereby closing a circuit including the solenoid 69. Energization of this solenoid results in the valve 68 being opened so as to admit air within the conduit 54 to pass into the cylinder 37 behind the piston 40. When the piston 40 and its rod 41 are moved by admission of air within the cylinder 37 as just described the jaws will advance and clamp about a workpiece 56 as described in detail above.

After the workpiece 56 has been clamped the member 75 will have actuated the switch 72 which will break the circuit including the solenoid 67. De-energization of the solenoid 67 permits the spring 66 to move the valve member 65 so that the valve will direct air into the line 63. Air introduced into the cylinder 26 through the conduit 63 will force the piston 76 and its rod 27 to the right, as viewed in Figures 6 and 7, thereby also moving the carriage 13 to the right. During this time the solenoid 69 remains energized and, therefore, the jaw members 50 remain clamped on the piece 56.

When the carriage 13 has been returned to the full-line position of Figure 6 the member 73 will engage the limit switch 71 thus breaking the circuit including the solenoid 69. De-energization of this solenoid will result in the valve 68 being closed so that the piston 40 and rod 41 may be moved to return position under influence of the spring 42. Such movement of the piston rod 41 results in the jaw members opening as described in detail above. In this manner the work-piece 56 is taken from the master machine and relocated as desired.

When the master machine again causes actuation of the limit switch 70 the solenoid 67 will again be energized and the above described operation will be repeated. Thus the mechanism of this invention is capable of removing a succession of workpieces from a master machine.

It will be apparent that various modifications may be made in the mechanism constituting this invention without departing from the scope and spirit thereof. It is to be understood that while I have shown my invention as embodied in particular arrangements and constructions I do not intend to be limited to such arrangements except in so far as they are specifically set forth in the subjoined claims. It is believed that the invention has been described clearly above and further review of its operation would be repetitious.

Having thus described my invention what I claim as new and what I desire to protect by United States Letters Patent is:

1. Mechanism for moving workpieces from one position to another comprising a base frame, a pair of horizontal tracks mounted in said frame, a carriage movable on said tracks, reciprocable jaw mechanism mounted in said carriage, means to move said carriage, means to move said jaw mechanism into clamping engagement about a work piece, said carriage moving means including a cylinder, piston and piston rod, conduits connecting each end of said cylinder with a source of fluid power, a valve for alternately admitting fluid to either end of said cylinder through said conduits whereby to reciprocate said carriage, said jaw mechanism including a cylinder, piston and piston rod, another conduit connecting said last mentioned cylinder with a source of fluid power, another valve controlling admission of fluid to said other cylinder, admission of fluid to said other cylinder serving to move said jaw mechanism into clamping engagement about a work piece, and including a first electric circuit, a solenoid in said circuit, a control member for said first mentioned valve, said control member being connected to said solenoid, a spring connected to said control member, a second electric circuit, a second solenoid in said second circuit, said second solenoid actuating said other valve, a first limit switch in said first circuit, a second limit switch in said second circuit, a third limit switch in said first circuit, a pair of switch engaging means on said carriage, and other switch-engaging means on said jaw mechanism, said first limit switch being responsive to a master machine, said circuits arranged so that on closing of said first limit switch said solenoid will move said valve control member in opposition to said spring whereby to admit fluid within one end of said first cylinder and thus move said carriage along a path of travel, one of said pair of switch-engaging means engaging said second limit switch upon said carriage reaching the end of its path of travel to actuate said second valve and move said jaw mechanism into clamping engagement about a work piece, said other switch engaging means engaging said third limit switch upon clamping of said jaw mechanism to break said first electric circuit and de-energize said first solenoid so that said spring will move said valve member to admit fluid within the other end of said first cylinder and return said carriage to its original position, the other of said pair of switch engaging means engaging said second limit switch upon the carriage reaching its original position so as to de-energize said second solenoid and permit said jaw mechanism to release the work piece.

2. Mechanism for moving work pieces from one position to another comprising a base frame, a pair of horizontal tracks mounted in said frame, a carriage movable on said tracks, reciprocable jaw mechanism mounted in said carriage, means to move said carriage, means to move said jaw mechanism into clamping engagement about a work piece, said jaw mechanism including a block connected to said carriage, a first sleeve fixed in said block, a second sleeve slidable in said first sleeve, a cylinder in said second sleeve and supported from said carriage, a piston and piston rod in said cylinder, a first jaw member fixed to said second sleeve, a second jaw member pivoted to said first jaw member, a spring normally urging said jaw members apart, and a cam plate slidably mounted within said first jaw member, said piston rod being fixed to said cam plate whereby said rod can move said plate into engagement with said second jaw member to move same against said spring and towards said first jaw member.

3. The mechanism of claim 2 in which there is a lug on said second sleeve, a lug on said first jaw member, and spring biased detent means in said first jaw member engageable in a pair of sockets provided in said cam plate, said lugs and detent means being arranged so that when the lug on said second sleeve engages said first sleeve further movement of said first jaw member will be halted, continued similar movement of said piston rod serving to move said cam plate within said first jaw member into contact with said second jaw member for clamping thereof, said detent means passing from one socket to the other.

References Cited in the file of this patent
UNITED STATES PATENTS

| | | |
|---|---|---|
| 980,004 | Reeder | Dec. 27, 1910 |
| 2,472,948 | Huff | June 14, 1949 |
| 2,701,650 | Stevenson III | Feb. 8, 1955 |
| 2,725,154 | Hendricks | Nov. 29, 1955 |
| 2,822,094 | Greer | Feb. 4, 1958 |

FOREIGN PATENTS

| | | |
|---|---|---|
| 1,511,478 | Belgium | June 14, 1952 |